United States Patent
Kuntner et al.

(10) Patent No.: US 10,197,140 B2
(45) Date of Patent: Feb. 5, 2019

(54) DUAL CLUTCH TRANSMISSION FOR A MOTOR VEHICLE

(71) Applicant: AVL LIST GMBH, Graz (AT)

(72) Inventors: Stefan Kuntner, Asten (AT); Gebhard Woentner, Wolfern (AT)

(73) Assignee: AVL LIST GMBH, Graz (AT)

( * ) Notice: Subject to any disclaimer, the term of this patent is extended or adjusted under 35 U.S.C. 154(b) by 267 days.

(21) Appl. No.: 14/895,013

(22) PCT Filed: May 27, 2014

(86) PCT No.: PCT/EP2014/060935
§ 371 (c)(1),
(2) Date: Dec. 1, 2015

(87) PCT Pub. No.: WO2014/195186
PCT Pub. Date: Dec. 11, 2014

(65) Prior Publication Data
US 2016/0116035 A1    Apr. 28, 2016

(30) Foreign Application Priority Data

Jun. 6, 2013 (AT) .............................. A 50373/2013

(51) Int. Cl.
*F16H 3/08* (2006.01)
*F16H 37/04* (2006.01)
(Continued)

(52) U.S. Cl.
CPC .......... *F16H 37/046* (2013.01); *F16H 3/006* (2013.01); *F16H 3/097* (2013.01); *F16H 3/093* (2013.01); *F16H 2200/0078* (2013.01)

(58) Field of Classification Search
CPC .......... F16H 37/021; F16H 2003/0931; F16H 2003/007; F16H 2003/008
(Continued)

(56) References Cited

U.S. PATENT DOCUMENTS 6,427,549 B1   8/2002   Bowen
7,150,698 B2   12/2006  Sakamoto et al.
(Continued)

FOREIGN PATENT DOCUMENTS

DE   102007018967   10/2008
EP   2481948        8/2012
(Continued)

OTHER PUBLICATIONS

English Abstract of DE 102007018967.

*Primary Examiner* — Ha Dinh Ho
(74) *Attorney, Agent, or Firm* — Dykema Gossett PLLC

(57) ABSTRACT

The invention relates to a dual clutch transmission (10) for a motor vehicle, having an input shaft (11) and a main shaft (13), wherein the input shaft (11) can be connected to a first counter shaft (16) via all engageable first clutch (18) and to a second counter shaft (17) via an engageable second clutch (19), wherein the first counter shaft (16) and the second counter shaft (17) can each be drivingly connected to the main shaft (13) via at least one gear stage (ZA1, ZA2, ZA3, ZA4, ZA5, ZR1) which can be selected via a selector device (20), and wherein a range group transmission (21) is arranged between the main shaft (13) and an output shaft (12) of the dual clutch transmission. High flexibility and variability in the arrangement and design of the permanent brake device and a powershift range group shift is made possible if at least one counter shaft (16) can be drivingly connected directly to the output shaft (12) via at least one gear stage (ZA7) bypassing the range group transmission (21), and if said counter shaft (16) or an intermediate shaft (16a) that can be connected to said counter shaft (16) can be or is drivingly connected directly or via a further gear stage (ZA8) to a permanent brake device (30).

28 Claims, 4 Drawing Sheets

(51) Int. Cl.
*F16H 3/00* (2006.01)
*F16H 3/097* (2006.01)
*F16H 3/093* (2006.01)

(58) Field of Classification Search
USPC .................................. 74/330, 331, 333, 340
See application file for complete search history.

(56) References Cited

U.S. PATENT DOCUMENTS

| | | |
|---|---|---|
| 9,068,637 B2 | 6/2015 | Hedman et al. |
| 9,546,721 B2 * | 1/2017 | Mittelberger ......... F16H 37/042 |
| 2009/0266190 A1* | 10/2009 | Dittrich ................... F16H 3/095 |
| | | 74/331 |
| 2009/0272211 A1 | 11/2009 | Hoffmann et al. |
| 2011/0259147 A1* | 10/2011 | Hoffmann ............. F16H 37/046 |
| | | 74/745 |
| 2017/0002899 A1* | 1/2017 | Priwitzer ................ F16H 3/006 |

FOREIGN PATENT DOCUMENTS

| | | |
|---|---|---|
| WO | 2012168116 | 12/2012 |
| WO | 2013187822 | 12/2013 |

* cited by examiner

DUAL CLUTCH TRANSMISSION FOR A MOTOR VEHICLE

BACKGROUND OF THE INVENTION

Field of the Invention

The invention relates to a dual clutch transmission for a motor vehicle which includes an input shaft and a main shaft, wherein the input shaft can be connected to a first countershaft via an engageable first clutch and to a second countershaft via an engageable second clutch, wherein the first countershaft and the second countershaft can each be drive-connected to the main shaft via at least one gear stage which can be switched via a switching device, and wherein a range group transmission is arranged between the main shaft and an output shaft of the dual clutch transmission.

The Prior Art

AT 510 966 B1 discloses a dual clutch transmission for a motor vehicle, comprising an input shaft and a main shaft, wherein the input shaft can be connected via an engageable first clutch to a first countershaft and via an engageable second clutch to a second countershaft. The first countershaft and the second countershaft can each be drive-connected to the main shaft via at least one pair of gears which can be switched by a switching device. A range group transmission is arranged between the main shaft and an output shaft of the transmission. A hydraulic unit is provided as a synchronisation device, which hydraulic unit comprises a first hydraulic machine which is drive-connected to the first countershaft and a second hydraulic machine which is drive-connected to the second countershaft.

The gears of such dual clutch transmissions can be shifted within a range group without any interruption in the tractive power. A changeover of the range group can only be produced by separating the tractive power.

Dual clutch transmissions with an input shaft and output shaft as well as two countershafts are known from the publications U.S. Pat. No. 6,427,549 B1 and EP 1 270 301 A2, wherein the speeds of the countershafts can be adjusted by a synchronisation devices to the speed of the output shaft. In this process, the speed of the countershaft which is not drive-connected to the input shaft is driven or braked via an electric motor until synchronisation occurs with a gear running freely on the countershaft, which gear is connected via a gear stage to the output shaft. Once synchronisation is present, the gear is drive-connected via a claw coupling to the countershaft.

DE 10 2007 018 967 A1 further describes an automated group transmission for a vehicle, comprising a main transmission and at least one upstream and/or downstream after-range group and at least one countershaft, wherein the countershaft is in operative connection with at least one hydraulic arrangement in order to provide a power take-off. The hydraulic arrangement comprises at least one drive unit for the open-loop and/or closed-loop control of each countershaft.

US 2009/272 211 A1 discloses a multi-group transmission of a motor vehicle, comprising two transmission groups arranged in a drive train, wherein load switching means formed by electromagnetic clutches are provided, via which an operative connection can be produced between a drive shaft and a main shaft or output shaft of the transmission by circumventing the power flow of at least one main group formed as a gear change speed gearbox.

A drive arrangement for commercial vehicles is described in WO 86/02608 A1, which comprises a change speed gearbox and a retarder braking device, which is arranged on a shaft which is driven at a speed-increasing ratio and is situated in an offset manner in relation to the output shaft of the change speed gearbox. The drive of the retarder braking device occurs via a spur gear stage, whose large wheel is arranged directly at the outlet of the output shaft from the change speed gearbox. A separating clutch is arranged between the drive of the retarder braking device and the retarder braking device.

A power-shift dual clutch transmission for a vehicle is known from WO 2011/069 526 A1, which transmission comprises a range group transmission between a main shaft and an output shaft. A retarder drive gear is arranged in a torsion-proof manner on the output shaft. The input shaft of the dual clutch transmission can be connected to the main shaft via a clutch and to a countershaft via the other clutch, wherein several switchable gear stages are arranged between the main shaft and the countershaft. The countershaft can be drive-connected to the retarder drive gear arranged on the output shaft via a bypass shaft and a gear stage, said bypass shaft circumventing the range group transmission. The range group transmission can thus be switched load-free by producing a drive connection between an idler gear of the gear stage and the bypass shaft via a switching element, as a result of which it can be shifted under load and without any interruption in the tractive power for the output shaft between a low and a high load stage. Furthermore, the bypass shaft can be drive-connected to a power take-off shaft by switching the switching element. Constructional necessities for the arrangement and positioning of the retarder braking device are produced by the central arrangement of the retarder drive gear on the output shaft.

It is the object of the invention to enable in the simplest possible way high flexibility and variability in the arrangement and design of the retarder braking device in a dual clutch transmission of the kind mentioned above on the one hand and to realise a power-shift range group change on the other hand.

SUMMARY OF THE INVENTION

This is achieved in accordance with the invention in such a way that at least one countershaft, preferably the first countershaft, can be drive-connected directly to the output shaft via at least one gear stage which is preferably switchable, especially preferably via precisely one additional gear stage, by bypassing the range group transmission, and said countershaft or an intermediate shaft that can be connected to said countershaft is or can be drive-connected directly or via a further gear stage to a retarder braking device.

In contrast to WO 2011/069 526 A1, the drive gear of the retarder braking device is spaced from the output shaft and can be driven coaxially to the first countershaft and by said shaft, or an aligned intermediate shaft, directly or indirectly via a further intermediate stage. The arrangement of the retarder braking device which is offset from the output shaft increases the freedom in the selection and construction of the retarder braking device and reduces the constructional necessities.

According to a first embodiment of the invention, the additional gear stage can be drive-connected to or severable from the output shaft via a switching device which is preferably only assigned to the additional gear stage, wherein preferably the additional gear stage comprises an idler gear which can be switched via the switching device.

The retarder braking device is preferably connected in a torsion-proof manner, either directly or indirectly, to a countershaft, preferably the first one thereof. The retarder braking device can be connected via at least one switching element in a torsion-proof manner to the output shaft indirectly via at least one gear stage. The retarder braking device is driven via the first countershaft directly or indirectly via the further gear stage and utilises the existing connection between the output shaft and the first countershaft (double use) on the one hand, which connection exists by the demand for the power-shift capability of the range group transmission, and (if this connection is not switched) the connection via the engaged gear on the other hand (countershaft on main shaft, via range group transmission to the output shaft). A highly compact design of the dual clutch transmission is achieved by the arrangement of the idler gear of the additional gear stage on the output shaft.

According to a further embodiment of the invention, the additional gear stage can be formed to be drive-connectable to or severable from the preferably first countershaft by means of a switching device, preferably via the intermediate shaft, wherein preferably the additional gear stage only comprises fixed gears. In comparison with idler gears, fixed gears reduce the production effort and the need for space. The retarder braking device can further be indirectly connected via at least one gear stage to the output shaft and directly or indirectly in a torsion-proof manner to an intermediate shaft, which can be connected via at least one switching device to the countershaft, preferably the first one thereof. The switching device for connecting the first countershaft to the output shaft is arranged in this case between the countershaft and the intermediate shaft, wherein the intermediate shaft is connected in a torsion-proof manner to a gear wheel of the additional gear stage. This arrangement allows greater constructional freedom than an arrangement of the switching device on the output shaft. The retarder braking device is driven via the intermediate shaft directly or indirectly via the further gear stage and utilises the existing connection between the output shaft and the intermediate shaft (double use), which connection exists as a result of the demand for the power-shift capability of the range group transmission. There is a lower production effort and a compact configuration of the dual clutch transmission through the decentralised arrangement of the switching element and the resulting use of fixed gears in the additional gear stage.

An exceptionally compact configuration of the dual clutch transmission can be realised with few parts by the direct drive of the retarder braking device by the first countershaft or the intermediate shaft.

If the retarder braking device is driven via a further gear stage, further freedoms are provided in the selection of the drive speed of the retarder braking device and the positioning of the retarder braking device. The further gear stage further allows a reversal in the direction of rotation with respect to the countershaft, so that the retarder braking device is driven in the same direction as the output shaft.

The retarder braking device can be formed as a hydrodynamic brake, an electrodynamic brake, a radial-piston machine or an axial-piston machine.

The first and the second clutch are advantageously formed as a wet multi-disc clutch, through which high torques can be transferred in combination with small mounting space and low weight.

The first clutch and the second clutch are preferably arranged coaxially to the main shaft. This allows a slender configuration of the dual clutch transmission.

It can be provided in a further embodiment of the invention that the range group transmission comprises a planetary gear. As a result, especially high transmission ratios and the number of gears required for useful gear spreading can be realised with a low number of components. The range group transmission can comprise two range groups, i.e. a slow range group and a fast range group. The at least one switchable additional gear stage can be or is drive-connected to the planetary carrier of the planetary gear.

It is especially advantageous if the first clutch connected to the input shaft is connected via a first gear stage to the first countershaft and the second clutch connected to the input shaft is connected via a second gear stage to the second countershaft, wherein preferably the first and the second gear stage have different transmission ratios. The countershafts are driven at different speeds by the different transmission stages. The first gear stage can be arranged between the first clutch and the first countershaft and the second gear stage between the second clutch and the second countershaft.

In an especially advantageous further embodiment, the speed-ratio change between the first and the second gear stage corresponds to the desired speed-ratio change between the individual transmission gears, thus enabling the identical formation of the gear groups on both countershafts.

The at least one additional gear stage is advantageously formed in such a way that the transmission ratio effectively acting on the output shaft lies between the highest gear stage of the slow range group and the lowest gear stage of the fast range group.

In order to enable direct power take-off, it can be provided in a further embodiment of the invention that the input shaft can be connected directly to the main shaft via a further switching device.

The dual clutch transmission can be formed modularly and consist of a clutch part, a main transmission part and the range group transmission part. As a result, it can be used for different applications and vehicles such as buses, trucks, road vehicles and all-terrain vehicles.

The additional gear stage is preferably arranged after the range group transmission, relating to the power flow in the drive case.

As a result of the arrangement as described above, a full power-shift dual clutch transmission can be realised in an especially simple way with a conventional range group.

When the slow range group is switched, the highest gear stage of the one countershaft, preferably the second countershaft, is engaged for an upshifting process and the clutch of the one countershaft is engaged. While the clutch of the other (preferably the first) countershaft is deactivated, the additional gear stage of the other countershaft is engaged. Subsequently, the clutch of the other countershaft can be engaged and simultaneously the clutch of the one countershaft can be disengaged. The drive now occurs via the additional gear stage. The range group transmission which is now relieved is switched from a slow range group to a fast range group, and the next higher gear stage of the one countershaft switched in a load-free manner is engaged. The clutch of the one countershaft is then engaged and simultaneously the clutch of the other countershaft is disengaged, and the drive is thus placed on the one countershaft again. The additional gear stage of the other countershaft which is now load-free can be deactivated again.

The downshifting process from a switched fast range group occurs in a precisely reversed manner: when the fast range group is switched, the lowest gear stage of the one countershaft, preferably the second countershaft, is engaged and the clutch of the one countershaft is engaged. While the clutch of the other, preferably the first, countershaft is disengaged, the additional gear stage of the other countershaft is engaged. The clutch of the other countershaft can then be engaged and simultaneously the clutch of the one countershaft can be disengaged. The drive now occurs via the additional gear stage, as in the upshifting process. The now relieved range group transmission can be switched from the fast range group to a slow range group and the next lower gear stage of the one countershaft switched in a load-free manner can be engaged. The clutch of the one countershaft is then engaged and simultaneously the clutch of the other countershaft is disengaged, with the drive thus being placed on the one countershaft again. The additional gear stage of the other countershaft which is now load-free can be deactivated again.

The special aspect of the method is that only one single connectable gear stage needs to be provided in order to enable a power-shift range group change. This has an advantageous effect on the overall size, the weight and the production costs.

BRIEF DESCRIPTION OF THE DRAWINGS

The invention will be explained below in greater detail by reference to the drawings, wherein.

DETAILED DESCRIPTION OF THE DEPICTED EMBODIMENTS

Figure 1:
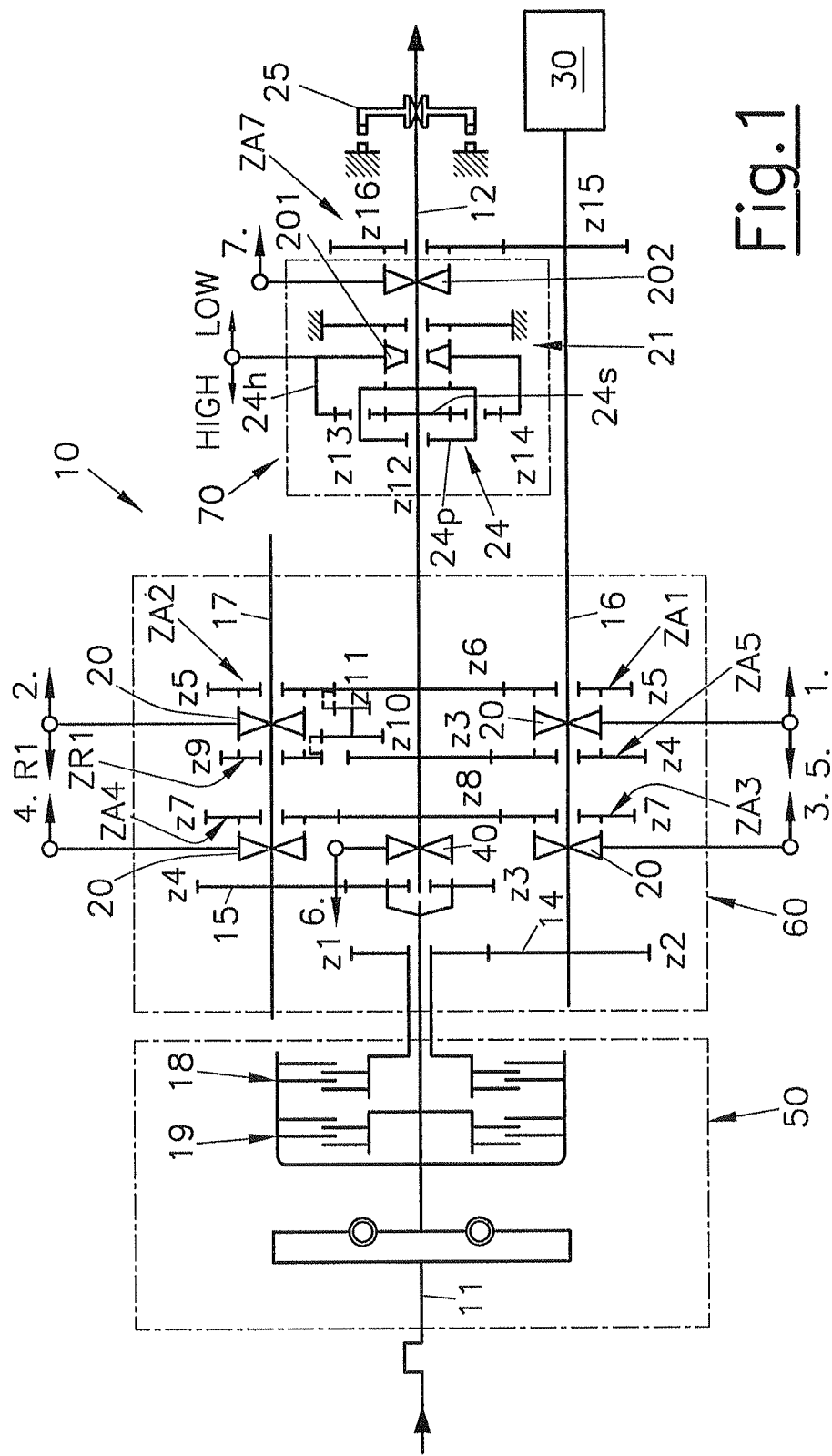
FIG. 1 shows a dual clutch transmission in accordance with a first embodiment of the invention.

The schematic drawings each show a dual clutch transmission 10 in accordance with the invention with twelve forward gears and one reverse gear.

The different gear stages are designated in the drawings with the reference numerals 1, 2, 3, 4, 5, 6, 7 for the forward gears and R1 for the reverse gear.

The dual clutch transmission 10 shown in the drawings comprises an input shaft 11 which is connected to an internal combustion engine (not shown in closer detail) and a main shaft 13 connected to an output shaft 12. The input shaft 11 is respectively connected to a first countershaft 16 and a second countershaft 17 via single-stage first and second gear stages 14, 15, which have different transmission ratios. A first engageable clutch 18 is disposed between the input shaft 11 and the first gear stage 14 or the first countershaft 16, and an engageable second clutch 19 between the input shaft 11 and the second gear stage 15 or the second countershaft 17. The clutches 18 and 19 are formed as wet multi-disc clutches. The first and the second clutch 18, 19 can be spring-loaded in the closed position, through which no active application of force is required in order to produce the drive connection between the input shaft 11 and the countershaft 16, 17. For security-related reasons, the closure can also occur with hydraulic pressure instead of with a closing spring in at least one of the two clutches 18, 19.

A range group transmission 21 which is connected to the main shaft 13 is further provided in the drive train of the dual clutch transmission 10, with which switching is enabled between high transmission ratios (fast range group HIGH) and low transmission ratios (slow range group LOW). In the simplest of cases, the range group transmission 21 can be formed from two pairs of gears with different transmission ratios with a respective fixed gear and an idler gear, between which switching can be carried out via a switching device. In a compact configuration, the range group transmission 21 can be formed as a planetary gear 24, wherein one element of the planetary gear 24 (e.g. the ring gear 24$h$) can be retained by a switching device 201 or can be connected to a second element of the planetary gear 24, e.g. the planet carrier 24$p$. The sun gear 24$s$ of the planetary gear can be connected to the main shaft 13.

A parking lock connected to the main shaft 13 or output shaft 12 is designated with reference numeral 25.

The countershafts 16, 17 are respectively connected to the main shaft 13 via the gear stages ZA1, ZA2, ZA3, ZA4, ZA5, ZR1. An additional switchable gear stage ZA7 is further provided between the first countershaft 16 and the output shaft 12, with which a gear 7 can be switched which lies between the highest gear 6 of the slow range group LOW and the lowest gear 2 of the fastest range group HIGH. The additional gear stage ZA7 can be arranged behind the range group transmission 21, as seen in the direction of drive.

The gears of the gear stages ZA1, ZA2, ZA3, ZA4, ZA5, ZA7, ZR1, the transmission stage 14, 15 and the range group transmission 21 are designated with z1, z2, z3, z4, z5, z6, z7, z8, z9, z11, z12, z13, z14, z15, z16, z17, wherein identical gears are provided with identical reference numerals.

Each gear stage ZA1, ZA2, ZA3, ZA4, ZA5, ZA7, ZR1 respectively comprises at least one gear revolving freely on a shaft, e.g. a countershaft 16, 17, and a gear connected in a torsion-proof manner another shaft, e.g. the main shaft 13. The gear stage ZR1 of the reverse gear R1 additionally further comprises a reversing gear z10. In order to save production costs, two gears situated opposite each other on the countershafts 16, 17 can be formed as similar parts. The gears can be mounted in a freewheeling manner on the countershaft 16, 17 and mesh with the gears connected in a torsion-proof manner to the main shaft 13.

In order to drive-connect the freely revolving gears with the respective countershaft 16, 17 or main shaft 13, switching elements 20, 202 are provided which can be formed by synchronising units or, especially in the case of external electrical or hydraulic synchronisation devices, by simple, non-synchronised claw clutches. The switching elements 20, 201, 202 can be actuated hydraulically for example via actuators (not shown in closer detail).

Figure 2:
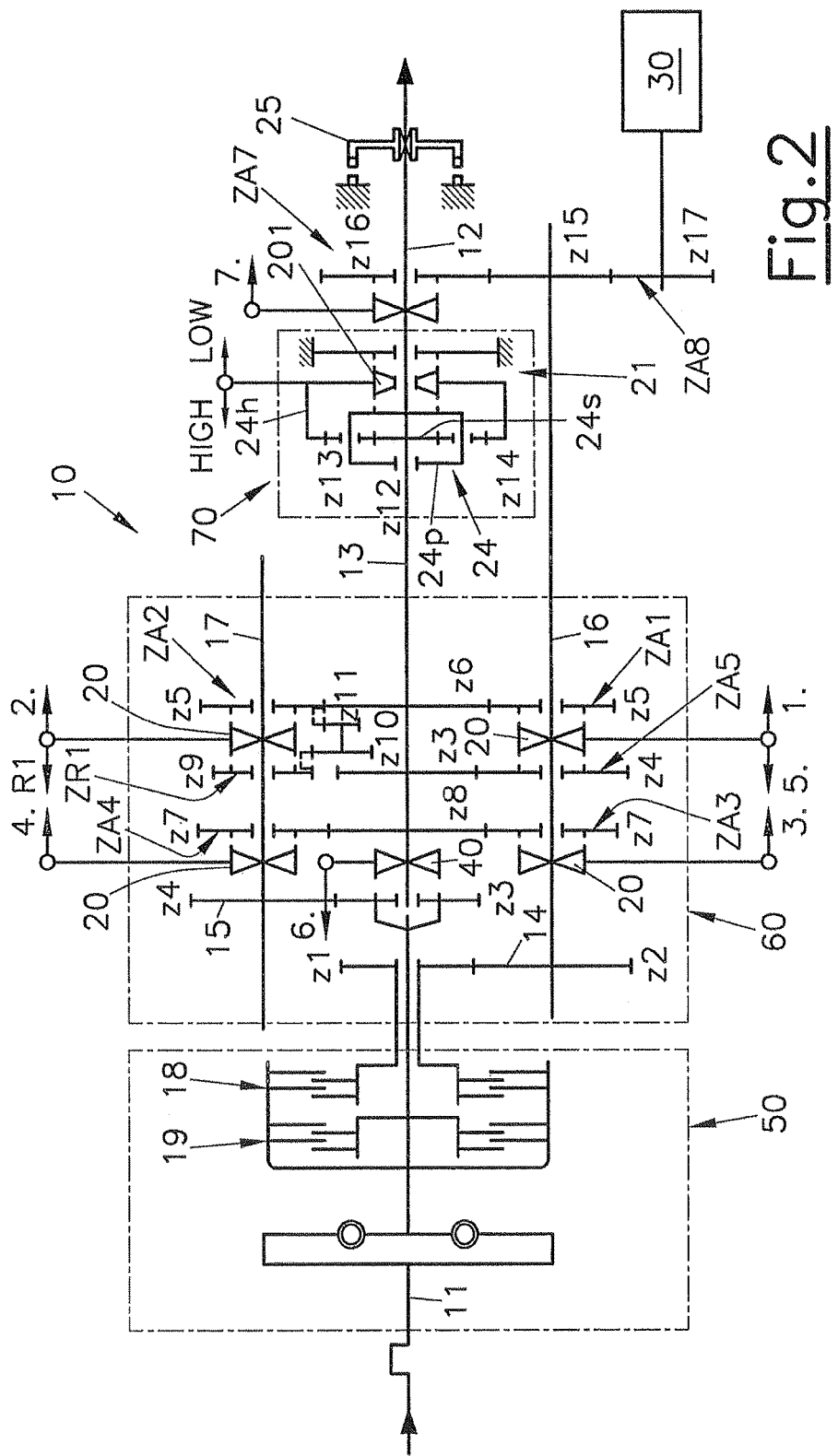
FIG. 2 shows a dual clutch transmission in accordance with a second embodiment of the invention.
Figure 3:
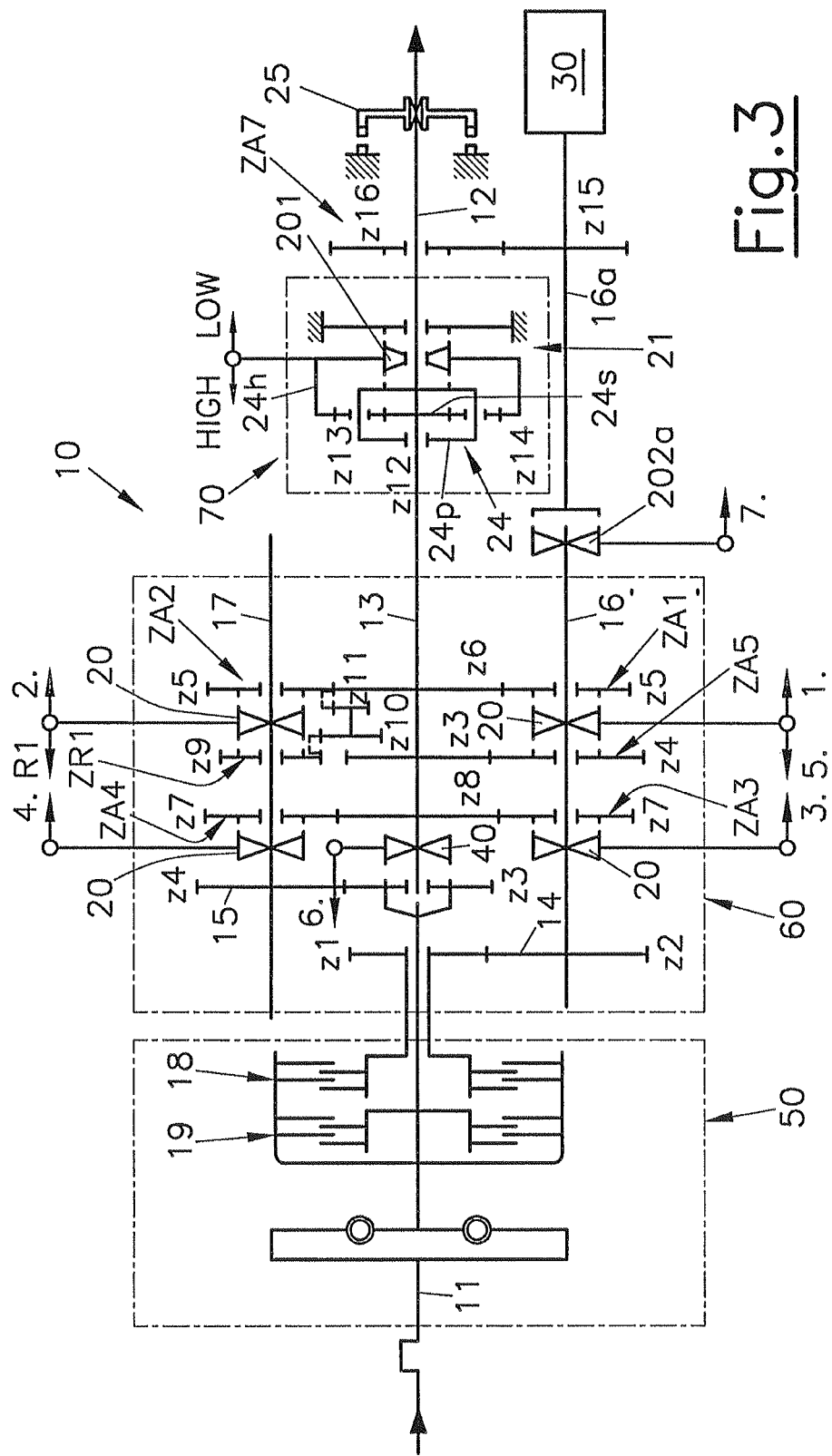
FIG. 3 shows a dual clutch transmission in accordance with a third embodiment of the invention.
Figure 4:
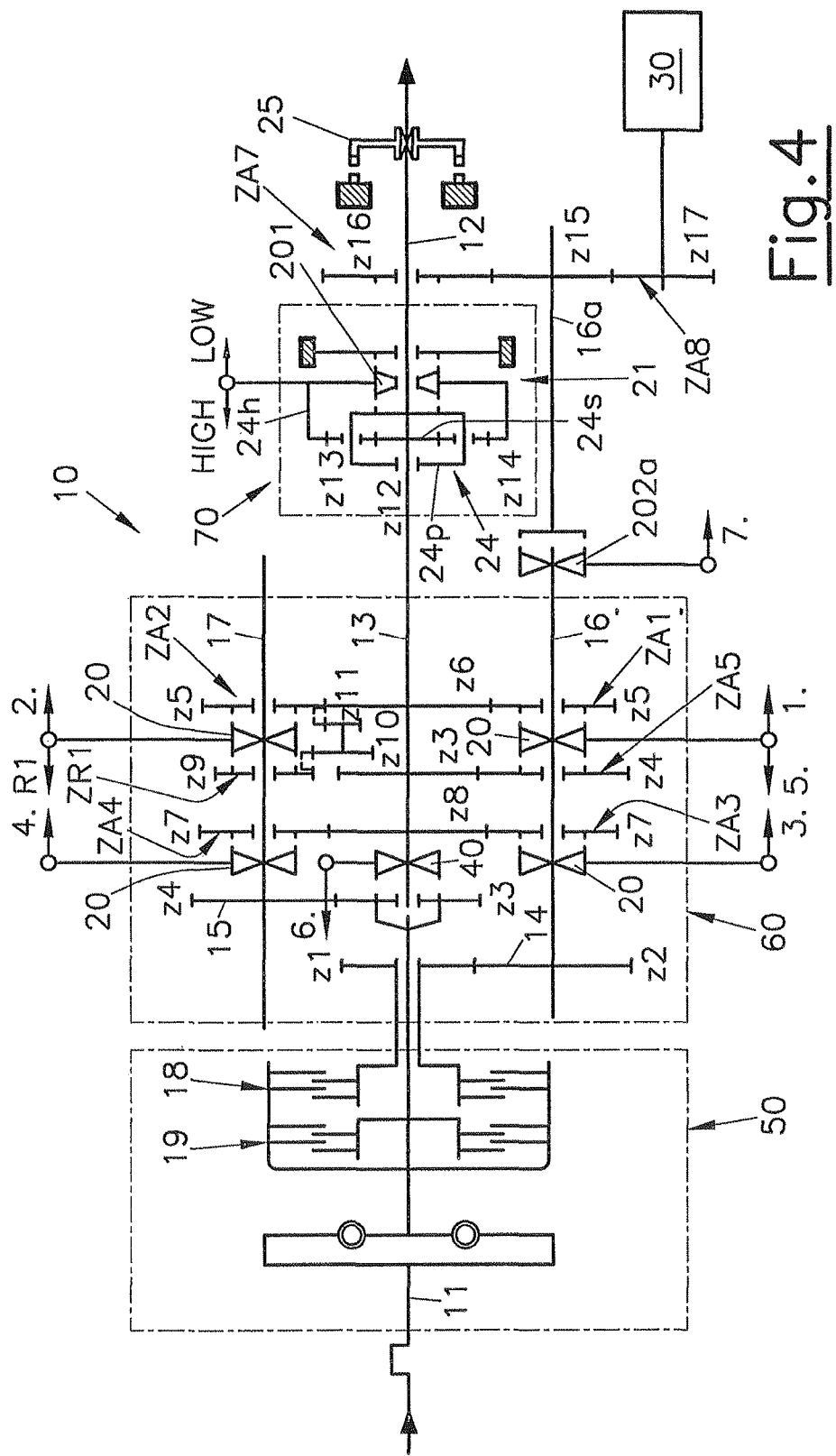
FIG. 4 shows a dual clutch transmission in accordance with a fourth embodiment of the invention.

The gear z16 of the additional gear stage ZA7, which can be switched via the first switching element 202$a$ and the second switching element 202, is in torsion-proof connection with the planet carrier 24$p$ of the planetary gear 24, wherein the switching elements 202, 202$a$ can be arranged either on the first countershaft 16 between the first countershaft 16 and an intermediate shaft 16$a$, which drive-connects the gear stage ZA7 to the first countershaft 16 (FIG. 3, FIG. 4), or on the output shaft 12 (FIG. 1, FIG. 2). If the first switching element 202$a$ is arranged between the first countershaft 16 and an intermediate shaft 16$a$, both gears of the additional gear stage ZA7 can be formed by fixed gears (FIG. 3, FIG. 4). If the second switching element 202 is arranged on the output shaft 12, a gear Z16 of the additional gear stage ZA7 is formed as an idler gear, i.e., it is not connected in a torsion-proof manner to the output shaft 12 (FIG. 1, FIG. 2).

In the drive case, one of the two countershafts 16, 17 is drive-connected via the respective clutch 18, 19 to the input shaft 11, while the respective other countershaft 17, 16 is separated from the drive shaft 11.

The countershaft which is drive-connected, e.g. the second countershaft 17, is drive-connected via an engaged gear stage, e.g. gear stage 4, to the main shaft 13. In the drive case, the main shaft 13 is drive-connected to the output shaft 12 via the switching device 201 of the range group transmission 21 switched to HIGH or LOW, and to the second countershaft 17 via a switched gear stage, e.g. gear stage 4. A power flow to the output shaft 12 thus occurs via the second clutch 19.

In the illustrated embodiment, the input shaft 11 can be connected directly to the main shaft 13 via a further switching device 40. Direct power take-off (designated here with gear stage 6) can thus be enabled between the input shaft 11 and the main shaft 13.

The dual clutch transmission 10 can be formed modularly and consist of a clutch part 50, a main transmission part 60 and the range group transmission part 70, and can thus be used for different applications and vehicles such as buses, trucks, road vehicles and all-terrain vehicles.

A retarder braking device (retarder) 30 is connected directly or indirectly to the first countershaft 16 or an intermediate shaft 16a via a further gear stage ZA8, which is formed by the fixed gears z15 and z17.

Upshifting Process:

If the highest gear 6 (direct power take-off) is reached in the main transmission 60 of the slower range group LOW, the additionally arranged, next higher gear 7 is engaged and normal power shifting is now carried out in the now load-free range group transmission 21 by means of a clutch change 19 to 18. Once the tractive power occurs via said gear 7, the range group 21 is without power transmission and can be brought to the neutral position and the range can thus be changed from LOW to HIGH. Once the change in the range has occurred, the next higher gear 2 can be engaged and normal power shifting can be carried out by means of clutch change 18 to 19.

Downshifting Process:

Once the lowest gear 2 has been reached in the main transmission 60 of the faster range group HIGH, the additionally arranged, next lower gear 7 is engaged and normal power shifting is carried out by means of a clutch change 19 to 18.

Once the tractive power occurs via said gear 7, the range group 21 is without power transmission and can be brought to the neutral position and the range can thus be changed from HIGH to LOW. Once the change in the range has occurred, the next lower gear 6 can be engaged and normal power shifting can be carried out by means of a clutch change 18 to 19.

Switching of the range group transmission 21 can thus be carried out without any interruption in the tractive power, wherein an exceptionally low additional effort is required with respect to the mechanical and control systems.

The modular configuration also allows an application and upgrade of already existing transmissions. As a result, an application in the most common dual clutch transmissions with range group is thus possible.

The invention claimed is:

1. A dual clutch transmission for a motor vehicle, comprising an input shaft and a main shaft, wherein the input shaft can be connected to a first countershaft via an engageable first clutch and to a second countershaft via an engageable second clutch, wherein the first countershaft and the second countershaft can each be drive-connected to the main shaft via at least one gear stage which can be switched via a switching device, and wherein a range group transmission is arranged between the main shaft and an output shaft of the dual clutch transmission, wherein at least one countershaft can be drive-connected directly to the output shaft via at least one gear stage by bypassing the range group transmission, and said at least one countershaft, or an intermediate shaft that can be connected to said at least one countershaft, is or can be drive-connected directly or via a further gear stage to a retarder braking device, wherein the retarder braking device is connected, directly or indirectly, in a torsion-proof manner to the intermediate shaft, which can be connected via at least one first switching element to said at least one countershaft.

2. The dual clutch transmission according to claim 1, wherein the additional gear stage can be drive-connected to or separated from the output shaft via a second switching element which is assigned to the additional gear stage.

3. The dual clutch transmission according to claim 2, wherein the additional gear stage comprises at least one idler gear which can be switched via the second switching element.

4. The dual clutch transmission according to claim 1, wherein the retarder braking device is connected, directly or indirectly, in a torsion-proof manner to one of said countershafts.

5. The dual clutch transmission according to claim 1, wherein the retarder braking device can be indirectly connected in a torsion-proof manner to the output shaft via at least one second switching element via at least one stage.

6. The dual clutch transmission according to claim 1, wherein the additional gear stage can be drive-connected to or separated from one of the countershafts by means of the first switching element.

7. The dual clutch transmission according to claim 1, wherein the additional gear stage only comprises fixed gears.

8. The dual clutch transmission according to claim 1, wherein the retarder braking device is indirectly connected in a torsion-proof manner to the output shaft via at least one gear stage.

9. The dual clutch transmission according to claim 1, wherein the intermediate shaft can be connected via said at least one first switching element to the first countershaft.

10. The dual clutch transmission according to claim 1, wherein the retarder braking device is formed as a hydrodynamic brake, an electrodynamic brake, a radial-piston machine or an axial-piston machine.

11. The dual clutch transmission according to claim 1, wherein the range group transmission comprises a planetary gear, wherein the planetary gear has a planetary carrier.

12. The dual clutch transmission according to claim 11, wherein the planetary carrier of the planetary gear is connected in a torsion-proof manner to the output shaft.

13. The dual clutch transmission according to claim 1, wherein the range group transmission comprises a slow range group (LOW) and a fast range group (HIGH).

14. The dual clutch transmission according to claim 1, wherein the first clutch connected to the input shaft is connected to the first countershaft via a first gear stage, and the second clutch connected to the input shaft is connected via a second gear stage to the second countershaft.

15. The dual clutch transmission according to claim 14, wherein the speed-ratio change between the first and the second gear stage corresponds to the desired speed-ratio change between the individual transmission gears.

16. The dual clutch transmission according to claim 1, wherein the input shaft can be connected directly to the main shaft via an additional switching device.

17. The dual clutch transmission according to claim 13, wherein the additional gear stage is formed in such a way that the transmission ratio effectively acting on the output shaft lies between the highest gear stage of the slow range group (LOW) and the lowest gear of the fast range group (HIGH).

18. The dual clutch transmission according to claim 1, wherein the dual clutch transmission comprises a clutch part, a main transmission part and a range group transmission part.

19. The dual clutch transmission according to claim 1, wherein the additional gear stage is arranged after the range group transmission, relating to the power flow in drive case.

20. The dual clutch transmission according to claim 1, wherein said at least one countershaft is the first countershaft.

21. The dual clutch transmission according to claim 1, wherein said at least one gear stage is switchable.

22. The dual clutch transmission according to claim 21, wherein said at least one gear stage is switchable via precisely one additional gear stage.

23. The dual clutch transmission according to claim 2, wherein the additional gear stage can be drive-connected to or separated from the output shaft via the second switching element which is only assigned to the additional gear stage.

24. The dual clutch transmission according to claim 4, wherein the retarder braking service is connected directly or indirectly, in a torsion-proof manner to the first countershaft.

25. The dual clutch transmission according to claim 6, wherein the additional gear stage can be drive-connected to or separated from the first countershaft by means of the first switching element.

26. The dual clutch transmission according to claim 6, wherein the additional gear stage can be drive-connected to the first countershaft via the intermediate shaft.

27. The dual clutch transmission according to claim 11, wherein the at least one switchable additional gear stage is or can be drive-connected to the planetary carrier of the planetary gear.

28. The dual clutch transmission according to claim 14, wherein the first and the second gear stage have different transmission ratios.

* * * * *